(12) United States Patent
Wu et al.

(10) Patent No.: US 11,481,479 B2
(45) Date of Patent: Oct. 25, 2022

(54) MAGNETIC SWITCH

(71) Applicant: HEWLETT-PACKARD DEVELOPMENT COMPANY, L.P., Spring, TX (US)

(72) Inventors: Kuan-Ting Wu, Taipei (TW); Wei-Chung Chen, Taipei (TW); Xuan-Fang Shi, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 295 days.

(21) Appl. No.: 16/634,003

(22) PCT Filed: Sep. 28, 2017

(86) PCT No.: PCT/US2017/054070
§ 371 (c)(1),
(2) Date: Jan. 24, 2020

(87) PCT Pub. No.: WO2019/066864
PCT Pub. Date: Apr. 4, 2019

(65) Prior Publication Data
US 2021/0097161 A1    Apr. 1, 2021

(51) Int. Cl.
*G06F 21/32* (2013.01)
*G06F 21/46* (2013.01)
*G06F 21/60* (2013.01)
*G06F 1/16* (2006.01)

(52) U.S. Cl.
CPC .............. *G06F 21/32* (2013.01); *G06F 21/46* (2013.01); *G06F 21/602* (2013.01); *G06F 1/1679* (2013.01)

(58) Field of Classification Search
CPC ........ G06F 21/32; G06F 1/1679; G06F 21/36; G06F 21/602
See application file for complete search history.

(56) References Cited

U.S. PATENT DOCUMENTS

| 6,980,672 | B2 | 12/2005 | Saito |
| 7,489,920 | B2* | 2/2009 | Kim ................... H04M 1/0245 455/411 |
| 7,655,908 | B2* | 2/2010 | Kerr ...................... G01C 21/20 348/115 |
| 7,855,877 | B2 | 12/2010 | Zende et al. |

(Continued)

FOREIGN PATENT DOCUMENTS

| CN | 2499877 Y | 7/2002 |
| CN | 2499877 Y * | 10/2002 |

(Continued)

OTHER PUBLICATIONS

How to Disaable Boot on Lid Open on MacBook Pro (late 2016 Models).

*Primary Examiner* — James R Turchen
(74) *Attorney, Agent, or Firm* — Brooks, Cameron & Huebsch PLLC (57) ABSTRACT

A system may include a fingerprint scanner and a magnetic switch coupled to the fingerprint scanner. The magnetic switch may couple a lid of a computing device to abase of a computing device. The system may further include an infrared (IR) scanner coupled to the magnetic switch. Additionally, the system may include an electronic switch coupled to the IR scanner.

14 Claims, 5 Drawing Sheets

(56) References Cited

U.S. PATENT DOCUMENTS

| | | | |
|---|---|---|---|
| 8,550,339 B1 | 10/2013 | Newman et al. | |
| 10,380,398 B2* | 8/2019 | Jiang | G06V 40/1306 |
| 2003/0070079 A1* | 4/2003 | Cromer | G06F 21/32 |
| | | | 713/186 |
| 2004/0189017 A1 | 9/2004 | Chen | |
| 2005/0210271 A1 | 9/2005 | Chou | |
| 2008/0253624 A1* | 10/2008 | Wong | G06V 40/13 |
| | | | 382/124 |
| 2009/0044023 A1* | 2/2009 | Crumlin | G06F 3/03547 |
| | | | 713/186 |
| 2012/0019356 A1* | 1/2012 | Gagneraud | G06F 21/32 |
| | | | 340/5.32 |
| 2015/0067422 A1* | 3/2015 | Hamilton | G06F 11/24 |
| | | | 714/724 |
| 2016/0212317 A1 | 7/2016 | Alameh et al. | |
| 2017/0185419 A1 | 6/2017 | Park et al. | |
| 2017/0228594 A1* | 8/2017 | Takemoto | G06V 10/50 |
| 2017/0336836 A1* | 11/2017 | Mörsky | G06V 40/166 |
| 2017/0372114 A1* | 12/2017 | Cho | G06F 3/0412 |
| 2018/0012070 A1* | 1/2018 | Shin | G06V 40/67 |
| 2018/0121724 A1* | 5/2018 | Ovsiannikov | G06V 40/19 |
| 2019/0026453 A1* | 1/2019 | Choi | H04L 9/3231 |

FOREIGN PATENT DOCUMENTS

| | | |
|---|---|---|
| WO | WO-2010126504 | 11/2010 |
| WO | WO-2011030958 | 3/2011 |

* cited by examiner

MAGNETIC SWITCH

BACKGROUND

Security protocols may aid in preventing unwanted or unauthorized access to devices such as computers, By undergoing an authentication process, a user may be verified as an authorized user of a particular device. Such authorization processes may protect the security and integrity of the device.

DETAILED DESCRIPTION

A computing device may use security protocols to prevent unauthorized access to the device. One example of a security protocol may be password protection. Password protection consists of receiving an input, often in the form of an alphanumeric sequence, from a user prior to granting access to the computing device. Upon receipt of the input, the input may be compared to a stored password within the computing device. If the inputted password matches the stored password, the user may be granted access to the computing device. If, however, the inputted password does not match the stored password, the user may not be granted access to the computing device. The user may be notified by, for example, a display screen, that the inputted password did not match the stored password. In some examples, the user may be given a subsequent opportunity to enter a password to gain access to the computing device.

Security protocols may further include physical protocols. One example of a physical security protocol is a fingerprint scanner. As used herein, a fingerprint scanner refers to biometric security technology that uses a fingerprint pattern to identify and/or authenticate a person. A security protocol involving a fingerprint scanner may include taking an initial fingerprint of a user or a plurality of users. The initial fingerprint(s) may be stored in a database. When a user later seeks access to, for example, a system or a computing device, the user may rescan his fingerprint on the fingerprint scanner. The scanned fingerprint may be compared with the fingerprint(s) in the database to determine if a match exists. If a match is found, the user may be permitted to access the system or the computing device.

With respect to a computing device, such as a laptop, a fingerprint scanner may be used in addition to or in lieu of a password. For example, a fingerprint scanner may be used to authenticate a user of the computing device and grant the user access to the computing device. In some examples, a user may have the option to scan a fingerprint or input a password. If the user opts to scan a fingerprint, upon successful authentication, a password may not be inputted.

Another example of a physical security protocol is an infrared (IR) scanner. As used herein, an IR scanner refers to a scanner that uses IR light to capture an image, One type of IR scanner is an iris scanner. As used herein, an iris scanner refers to a biometric imaging system that uses patterns inherent in a user's iris to identify the user. An iris scanner may use IR or near-IR light to capture an image of the patterns of a user's iris. The iris scanner may then compare the captured pattern with a database of known iris patterns to authenticate the user. Another type of IR scanner is a retinal scanner. As used herein, a retinal scanner refers to a biometric imaging system that uses the pattern of blood vessels on a user's retina to identify the user. Like an iris scanner, a retinal scanner may use IR or near-IR light to capture an image of the blood vessels on a user's retina and compare the captured blood vessel pattern with a database of known blood vessel patterns to identify the user.

IR scanners, such as iris scanners, may be located on a computing device and may thus be used to authenticate a user of the computing device. However, IR scanners use circuitry to receive power to the IR scanner and thus, the IR scanner may not work if the computing device is not powered on. This may result in a user having to turn the computer device on prior to being authenticated.

A magnetic switch according to the present disclosure, by contrast, may use multiple forms of authentication to grant access to a computing device. As used herein, a magnetic switch refers to a particular type of electrical switch that moves (e.g., switches on or off) in response to a magnetic field being applied to the switch. On a computing device, a magnetic switch may be used to, for example, lock a cover or lid of a computing device to a base of the computing device. The magnetic switch may be coupled to a fingerprint scanner such that, upon a successful authentication of a fingerprint, the magnetic switch may disengage. The magnetic switch may further be coupled to an IR scanner, such that when the magnetic switch disengages, the IR scanner is powered on. The IR scanner may then capture an input, such as an iris scan.

Figure 1A:
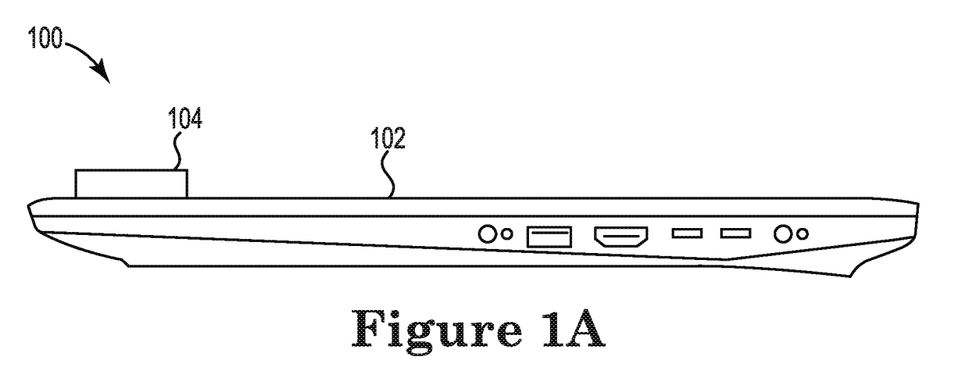
FIG. 1A is an example system for a magnetic switch consistent with the present disclosure.

FIG. 1A is an example system 100 for a magnetic switch consistent with the present disclosure. System 100 may include a computing device 102. Computing device 102 may be a laptop computer, although examples are not so limited. As shown in FIG. 1A, the computing device 102 may include a base and a lid, which may be coupled together by means of a magnetic switch (not shown). The magnetic switch is further discussed with respect to FIG. 2. System 100 may further include a fingerprint scanner 104, As described previously, a fingerprint scanner refers to a biometric scanner that uses an input in the form of a fingerprint to authenticate a user. Fingerprint scanner 104 may be coupled to the magnetic switch. As shown in FIG. 1, fingerprint scanner 104 may be located on an outer surface of computing device 102, although examples are not so limited.

Figure 1B:
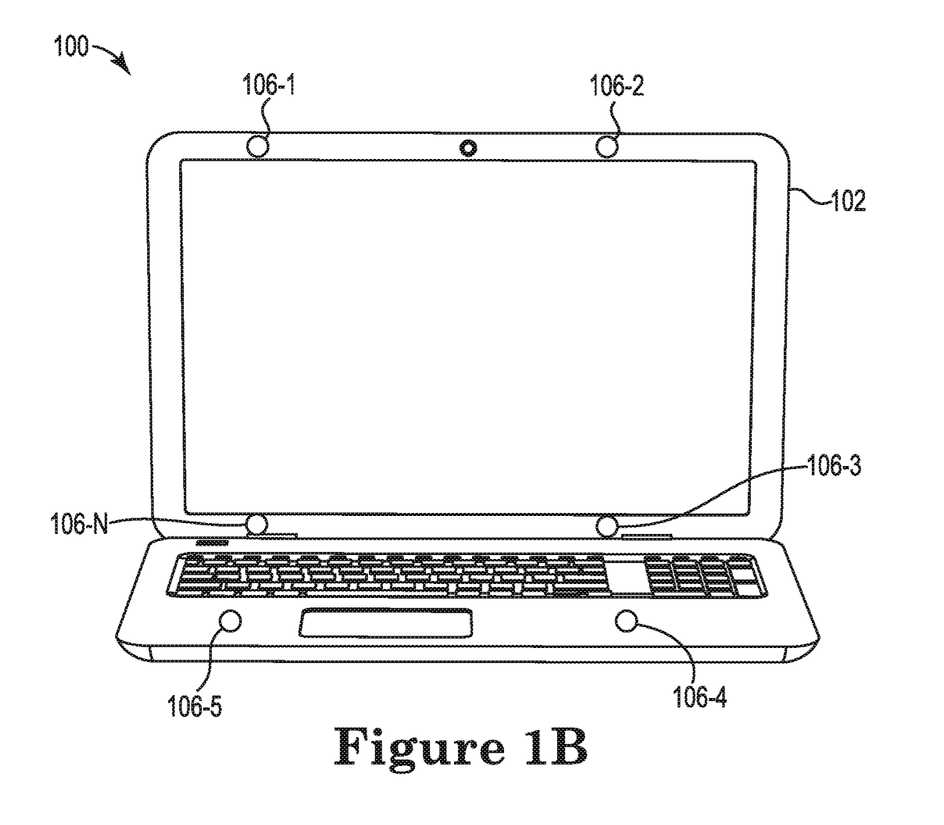
FIG. 1B is another example system for a magnetic switch consistent with the present disclosure.

FIG. 1B is another example system 100 for a magnetic switch consistent with the present disclosure. System 100 may include a computing device 102. As shown in FIG. 1B, the computing device 102 may be open: that is, a lid of the computing device may be raised. System 100 may further include a plurality of IR sensors 106-1, 106-2 . . . 106-N (collectively, IR sensors 106). As shown in FIG. 1B, IR sensors 106 may be disposed around an inner surface of the computing device 102, although examples are not so limited. IR sensors 106 are discussed further with respect to FIG. 2.

Figure 2:
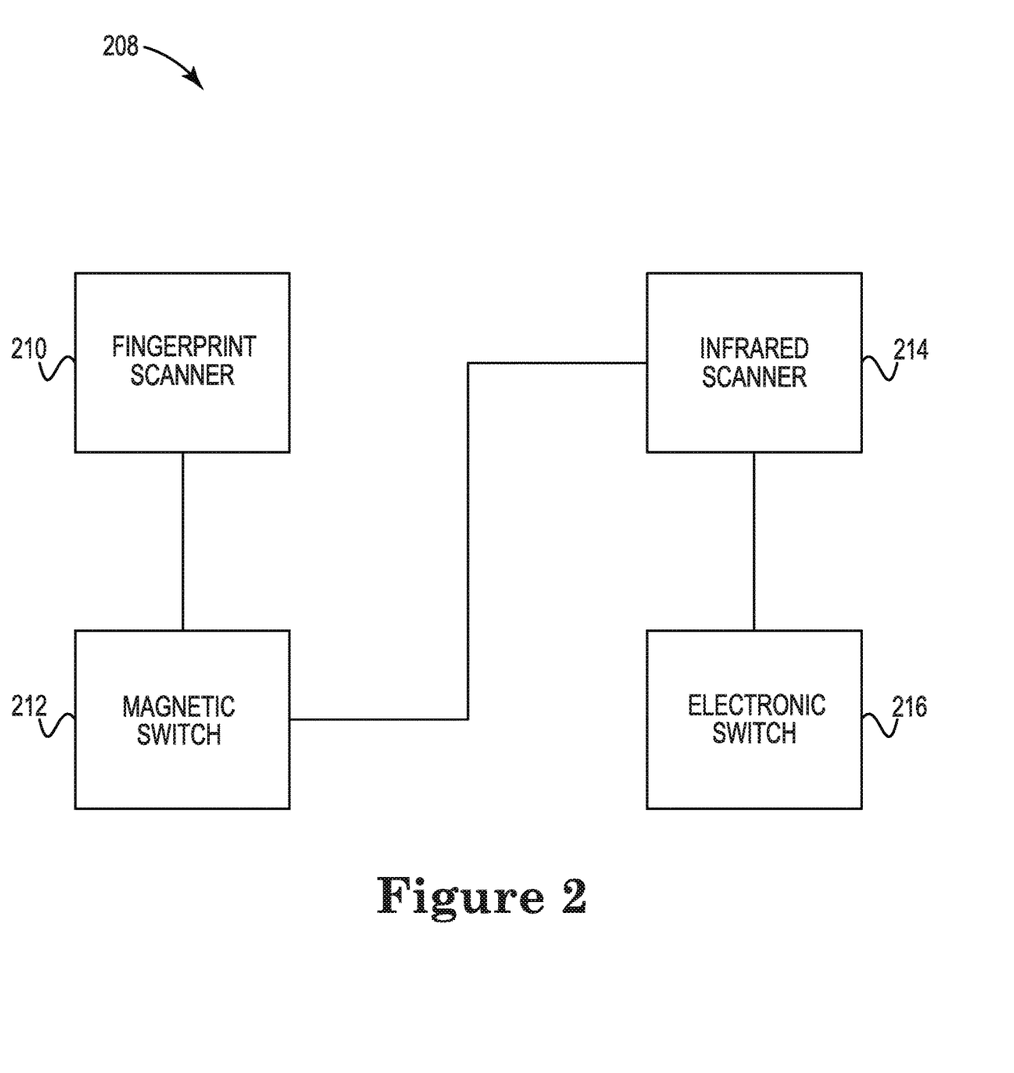
FIG. 2 is another example system for a magnetic switch consistent with the present disclosure.

FIG. 2 is another example system 208 for a magnetic switch 212 consistent with the present disclosure. System 208 may include a fingerprint scanner 210. Fingerprint scanner 210 may be akin to fingerprint scanner 104, discussed with respect to FIG. 1A. Fingerprint scanner 210 may be coupled to a magnetic switch 212. As described previously, a magnetic switch refers to a particular type of electronic switch that operates when a magnetic field is applied to the magnetic switch.

Magnetic switch 212 may couple a lid of a computing device to a base of a computing device. That is, magnetic switch 212 may be located within a computing device, such as a laptop, such that two components of the device may be coupled together. As such, magnetic switch 212 may "lock" a lid of the computing device to the base of the computing device. Said differently, magnetic switch 212 may secure the lid of the computing device to the base of the computing device when magnetic switch 212 is engaged. Fingerprint scanner 210 may be located on an outer surface of the lid of the computing device. Thus, fingerprint scanner 210 may be accessible even when magnetic switch 212 is engaged. Said differently, fingerprint scanner 210 may be accessible when the lid of the computer device is coupled to the base of the computing device by the magnetic switch 212.

Fingerprint scanner 210 may receive an input. In some examples, the input may be a fingerprint. Upon receipt of the input, fingerprint scanner 210 may compare the received input to a database of known inputs. In some examples, fingerprint scanner 210 may compare an inputted fingerprint to a database of known fingerprints. The database of known fingerprints may include fingerprints of, for example, users authorized to access the computing device. Thus, a comparison of the received input to the database of known fingerprints by fingerprint scanner 210 may allow fingerprint scanner 210 to determine whether the user (i.e. the person whose fingerprint was scanned) is authorized to use the computing device.

If fingerprint scanner 210 determines that the received input corresponds to a known input, fingerprint scanner 210 may transmit a signal to magnetic switch 212. As used herein, a signal refers to an electronic message transmitted between two components of a device. A signal transmitted by fingerprint scanner 210 may indicate whether the input received at fingerprint scanner 210 matched or corresponded to a known input. In some examples, the signal may be transmitted to magnetic switch 212 to indicate that the received input corresponds to a known input. The signal may further include an indication that magnetic switch 212 is to disengage. That is, a signal transmitted from fingerprint scanner 210 may tell magnetic switch 212 to open when the input received at fingerprint scanner 210 corresponds to a known fingerprint. Upon receipt of the signal from fingerprint scanner 210, magnetic switch 212 may disengage. Said differently, magnetic switch 212 may open in response to receipt of a signal from fingerprint scanner 210. In some examples, disengagement of magnetic switch 212 may allow the lid of the computing device to be opened. That is, when magnetic switch 212 is disengaged, magnetic switch 212 may cease to couple the lid of the computing device to the base of the computing device, such that the lid is able to be opened.

If fingerprint scanner 210 determines that the received input does not correspond to a known input, fingerprint scanner 210 may transmit a signal to magnetic switch 212 indicating that no match was determined. In some examples, the signal may further include an indication that magnetic switch 212 is not to disengage. That is, if fingerprint scanner 210 determines that the received input does not correspond to a known input, fingerprint scanner 210 may instruct magnetic switch 212 to remain engaged. Therefore, magnetic switch 212 may continue to couple the lid of the computing device to the base of the computing device, such that the lid of the computing device may remain unable to open.

System 208 may further include an IR scanner 214. Although a single IR scanner 214 is shown, multiple IR switches may be included in system 208. As described previously, an IR scanner refers to a scanner that uses infrared light to capture an image. IR scanner 214 may be an iris scanner and may use IR light to capture the pattern of a user's iris. In some examples, the IR scanner 214 may be coupled to the magnetic switch 212. Thus, magnetic switch 212 may provide power to IR scanner 214 such that IR scanner 214 is able to perform a scan.

IR scanner 214 may be located on an inner perimeter of a lid of a computing device. Thus, IR scanner 214 may be accessible when the lid of the computing device is raised but not when the lid of the computing device is closed or lowered. In some examples, IR scanner 214 may be located opposite fingerprint scanner 210, such that fingerprint scanner 210 is located on an outer surface of a lid of a computing device and IR scanner 214 is located on a corresponding inner surface.

Magnetic switch 212 may provide power to IR scanner 214. As such, when magnetic switch 212 receives a signal to disengage, such as from fingerprint scanner 210, magnetic switch 212 may further receive a signal to provide power to IR scanner 214. In some examples, magnetic switch 212 may provide power to IR scanner 214 upon disengagement. In such examples, IR scanner 214 may be powered and thus ready to perform a scan when the lid of the computing device is raised or opened. IR scanner 214 may receive power from magnetic switch 212 and thus be ready to perform a scan while the computing device is powered off. Said differently, IR scanner 214 may be able to perform a scan without the computing device itself receiving power.

IR scanner 214 may be coupled to electronic switch 216. As used herein, an electronic switch refers to an electronic component or device that is used to complete or break a circuit. An electronic switch may complete a circuit, and thus provide current, when the switch is closed, and may break a circuit, thus ceasing to provide current, when the switch is open. Electronic switch 216 may be further coupled to other components of the computing device, such that when electronic switch 216 is closed, the components of the computing device receive current.

IR scanner 214 may receive an input. In some examples, the input may be an iris scan. IR scanner 214 may thus capture the pattern of an iris placed in front of the scanner. Upon receipt of the input, IR scanner 214 may compare the received input to a database of known inputs. In examples where IR scanner 214 receives an iris scan, the database of known inputs may be a database of known iris scan patterns. The database of known iris scan patterns may include iris scan patterns of authorized users of the computing device. Thus, comparing the received input to the database of known iris scan patterns by IR scanner 214 may allow fingerprint scanner 214 whether the user is authorized to use the computing device.

If IR scanner 214 determines that the received input corresponds to a known input, IR scanner 214 may transmit a signal to electronic switch 216. The signal transmitted by IR scanner 214 may indicate whether the input received at IR scanner 214 matched or corresponded to a known input. In some examples, the signal may be transmitted to electronic switch 216 to indicate that the received input corresponds to a known input. The signal may further include an indication that electronic switch 216 is to engage. That is, a signal transmitted from IR scanner 214 may tell engage switch 216 to close when the input received at IR scanner 214 corresponds to a known iris scan pattern. In some examples, engagement of electronic switch 216 may cause an operating system of the computing device to run. That is, electronic switch 216, when engaged, may direct current to a series of components of the computing device: the components, in turn, may cause an operating system of the computing device to run.

If IR scanner 214 determines that the received input does not correspond to a known input, IR scanner 214 may transmit a signal to electronic switch 216 indicating that no match was determined. In some examples, the signal may further include an indication that electronic switch 216 is not to engage. That is, if IR scanner 214 determines that the received input does not correspond to a known input, IR scanner 214 may instruct electronic switch 216 to remain disengaged, or open. Electronic switch 216 may thus not provide current to components of the computing device. Additionally, electronic switch 216 may refrain from causing an operating system of the computing device to run.

Figure 3:
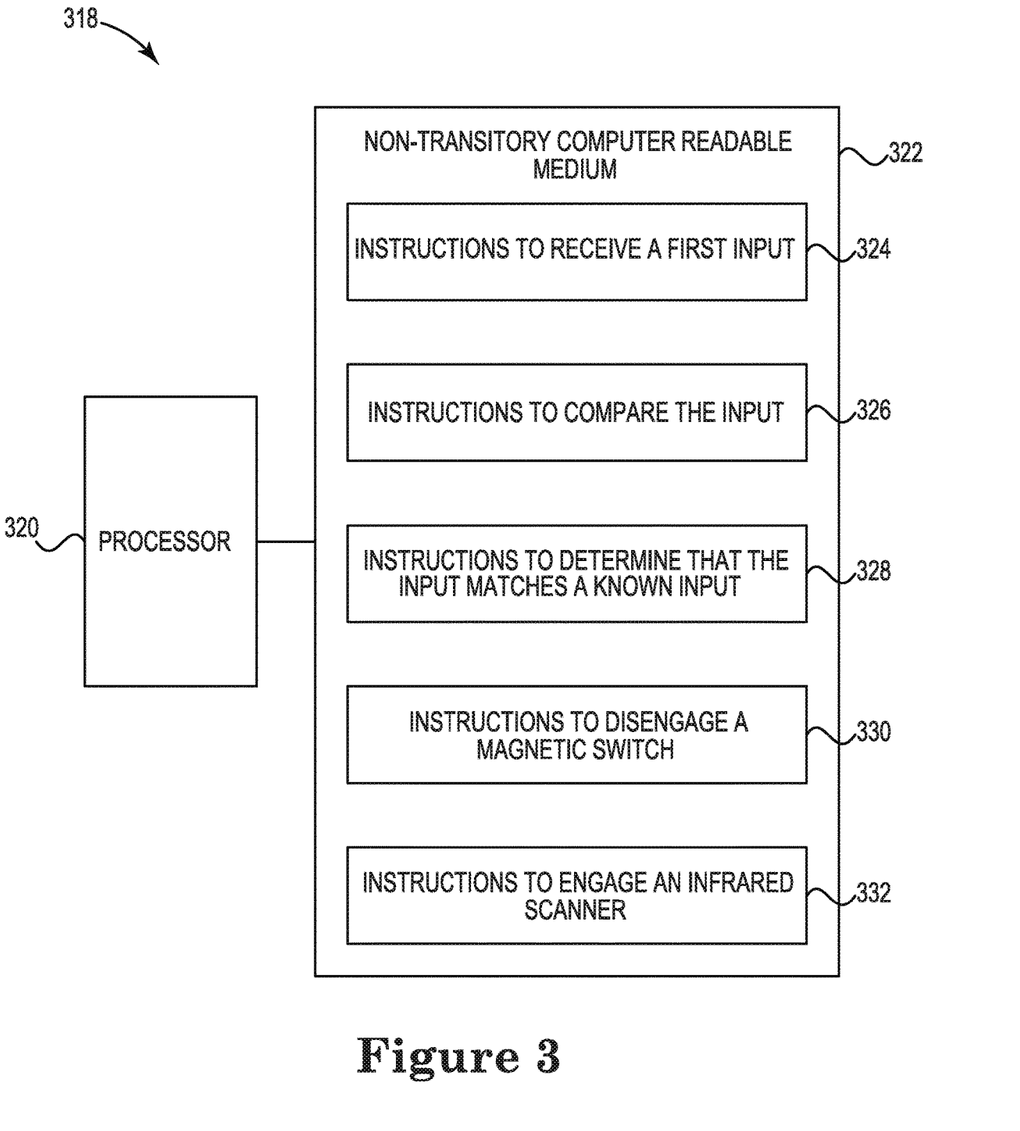
FIG. 3 is another example system for a magnetic switch consistent with the present disclosure.

FIG. 3 is another example system 318 for a magnetic switch consistent with the present disclosure. System 318 may include processor 320. System 318 may further include a non-transitory computer readable medium 322 on which may be stored instructions, such as instructions 324, 326, 328, 330, and 332. Although the following descriptions refer to a single processor and a single non-transitory computer readable medium, the descriptions may also apply to a system with multiple processors and multiple non-transitory computer readable media. In such examples, the instructions may be distributed (e.g., stored) across multiple non-transitory computer-readable media and the instructions may be distributed (e.g., executed by) across multiple processors.

Processor 320 may be a central processing unit (CPU), a semiconductor based microprocessor, and/or other hardware devices suitable for retrieval and execution of instructions stored in non-transitory computer readable medium 322. Processor 320 may fetch, decode, and execute instructions 324, 326, 328, 330, 332, or a combination thereof. As an alternative or in addition to retrieving and executing instructions, processor 320 may include at least one electronic circuit that includes electronic components for performing the functionality of instructions 324, 326, 328, 330, 332, or a combination thereof.

Non-transitory computer readable medium 322 may be electronic, magnetic, optical, or other physical storage device that stores executable instructions. Thus non-transitory computer readable medium 322 may be, for example, Random Access Memory (RAM), an Electrically-Erasable Programmable Read-Only Memory (EEPROM), a storage drive, an optical disc, and the like. Non-transitory computer readable medium 322 may be disposed within system 318, as shown in FIG. 3. In this example, the executable instructions may be "installed" on the system. Additionally and/or alternatively, non-transitory computer readable medium 322 may be a portable, external or remote storage medium, for example, that allows system 318 to download the instructions from the portable/external/remote storage medium. In this situation, the executable instructions may be part of an "installation package". As described herein, non-transitory computer readable medium 322 may be encoded with executable instructions for a magnetic switch.

Instructions 324, when executed by a processor such as processor 320, may include instructions to receive a first input at a fingerprint scanner. The fingerprint scanner may be akin to fingerprint scanner 210, described with respect to FIG. 2. In some examples, the first input may be a fingerprint. The fingerprint scanner may be located on a device, such as a computing device. In some examples, the fingerprint scanner may be located on an outside surface of the device, such that the fingerprint scanner is able to receive an input even when the device is closed.

Instructions 326, when executed by a processor such as processor 320, may include instructions to compare the first input at the fingerprint scanner to a database of known inputs. In some examples, the database of known inputs may comprise a database of known fingerprints. As described with respect to FIG. 2, the database of known fingerprints may include fingerprints of users authorized to use or access a particular device. Instructions 326 may therefore include instructions to compare the fingerprint captured as the first input by instructions 324 to the database of fingerprints of authorized users of the particular device.

Instructions 328, when executed by a processor such as processor 320, may include instructions to determine that the first input at the fingerprint scanner matches a known input. In some examples, the determination that the first input matches a known input may include determining that the first input at the fingerprint scanner matches one of the fingerprints stored in the database. That is, instructions 328 may include instructions to determine that the first input, when compared to the database of known inputs by instructions 326, matches one of the known inputs. In some examples, instructions 328 may include instructions to match the pattern of the fingerprint received by instructions 324 to the pattern of a known fingerprint within the database.

Instructions 330, when executed by a processor such as processor 320, may include instructions to disengage a magnetic switch. The magnetic switch may be akin to magnetic switch 212, described with respect to FIG. 2. As described previously, the magnetic switch may be used to connect two portions of a computing device, such as a lid and a base. Thus, when engaged, the lid and the base may be connected such that the lid is not able to be lifted. When disengaged by instructions 330, however, the magnetic switch may release the lid from the base such that the lid is able to be lifted and opened.

In some examples, instructions 330 may further include instructions executable to refrain from disengaging the magnetic switch. The magnetic switch may remain engaged when, for instance, a comparison of the input received by instructions 324 to a database of known inputs by instructions 326 does not return a match, That is, the magnetic switch may not disengage when the comparison of the inputted fingerprint does not correspond to a fingerprint included within the database as a known fingerprint or the fingerprint of an authorized user.

Instructions 332, when executed by a processor such as processor 320, may include instructions to engage an IR scanner. The IR scanner may be akin to IR scanner 214, described with respect to FIG. 2. In some examples, the IR scanner may be engaged in response to the disengagement of the magnetic switch by instructions 330, That is, instructions 332 may be executed when instructions 330 cause the magnetic switch to disengage. The IR scanner may be located on the same device that the fingerprint scanner is located on, and may be located at the same position or at a different position than the fingerprint scanner.

Figure 4:
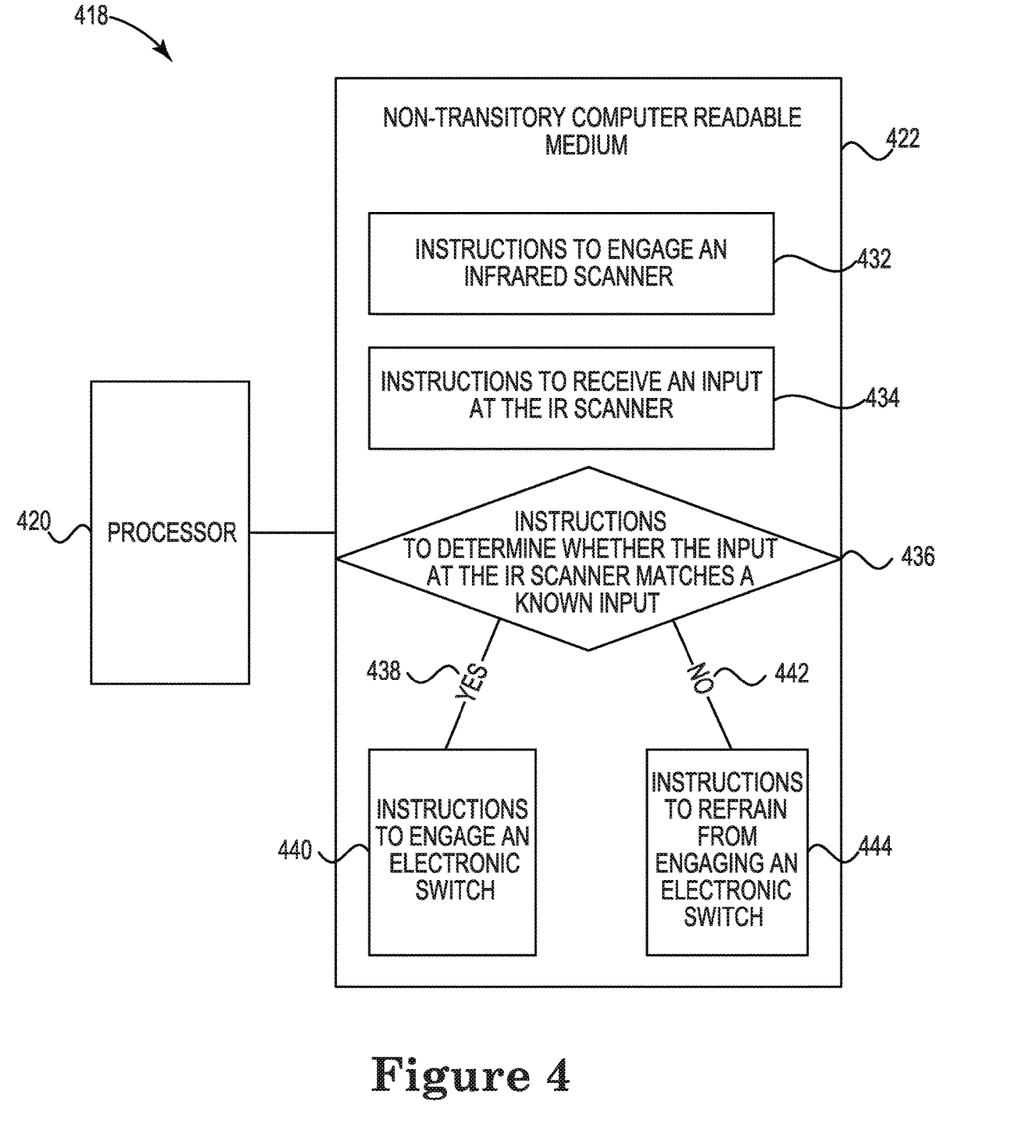
FIG. 4 is another example system for a magnetic switch consistent with the present disclosure.

FIG. 4 is another example system 418 for a magnetic switch consistent with the present disclosure. System 418 may include a processor 420. Processor 420 may be akin to processor 320, described with respect to FIG. 3. System 318 may further include a non-transitory computer readable medium 422. Non-transitory computer readable medium 422 may be akin to non-transitory computer readable medium 322 previously described with respect to FIG. 3. As shown in FIG. 4, non-transitory computer readable medium 422 may include instructions executable for a magnetic switch.

Instructions 432 may include instructions executable by processor 420 to engage an IR scanner. Instructions 432 may be akin to instructions 332, described with respect to FIG. 3, and the IR scanner may be akin to IR scanner 214, described with respect to FIG. 2. As described previously, instructions 432 may include instructions to engage an IR scanner in response to disengagement of a magnetic switch. That is, instructions 432 may cause engagement of an IR scanner upon disengagement of a magnetic switch.

Instructions 434 may include instructions executable by processor 320 to receive an input at the IR scanner. The IR scanner may be an iris scanner; thus, the received input may correspond to an iris scan of a user's eye. In some examples, instructions 434 may include instructions to capture a plurality of inputs from a plurality of IR scanners and combine the plurality of inputs into a single input. For instance, a plurality of IR scanners may capture a plurality of iris scans and combine the plurality of iris scans into a single, composite iris scan.

Instructions 436 may include instructions executable by processor 420 to determine whether the received input at the IR scanner matches a known input. As described previously, the input at the IR scanner may be compared to a database of known inputs. Thus, in the case of the IR scanner being an iris scanner, the captured iris scan pattern may be compared with a database of known iris scan patterns. In some examples, the database of known inputs may comprise inputs of users authorized to access the computing device that includes the IR scanner.

If the received input at the IR scanner is determined to match a known input ("yes" 438), instructions 440 may cause processor 420 to engage an electronic switch of the device. The electronic switch may be akin to electronic switch 216, described with respect to FIG. 2. As previously described, the electronic switch may be coupled to a plurality of components of the device, such that engagement of the electronic switch by instructions 440 provides current to the components, allowing them to operate. In some examples, instructions 440 may further include instructions executable to begin a booting sequence of the device. That is, upon engagement of the electronic switch, instructions 440 may provide further instructions to the device to begin running its operating system.

If, however, the received input at the IR scanner is determined not to match a known input ("no" 442), instructions 444 may cause processor 420 to refrain from engaging an electronic switch. That is, instructions 444 may include instructions that the electronic switch is to remain disengaged, or open. Thus, the electronic switch may not provide current to components of the computing device. Moreover, the electronic switch may refrain from causing an operating system of the computing device to run.

Figure 5:
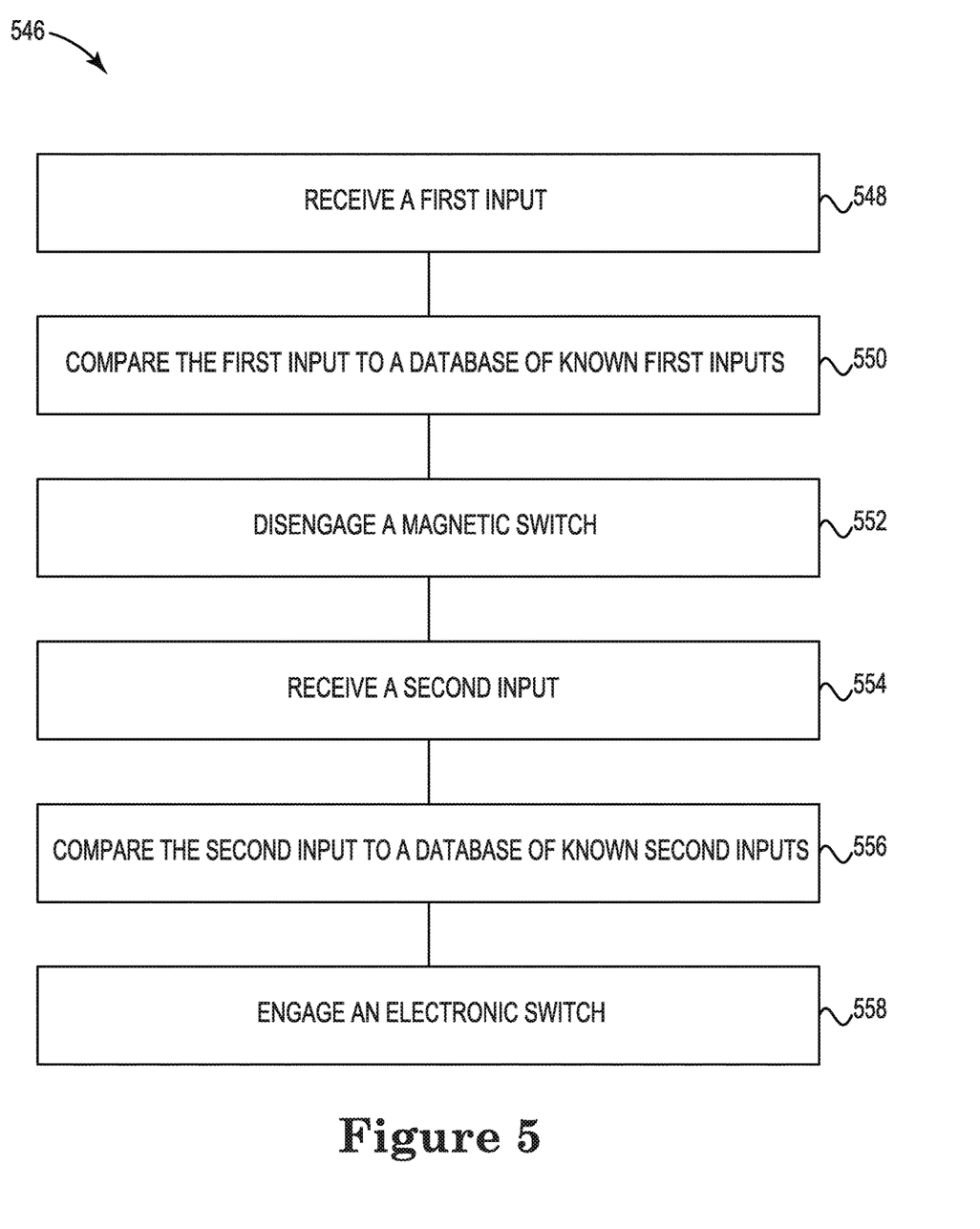
FIG. 5 is an example method for use of a magnetic switch consistent with the present disclosure.

FIG. 5 is an example method 546 for using a magnetic switch consistent with the present disclosure. At 548, method 546 may include receiving a first input. In some examples, the first input may be received at a fingerprint scanner of a device. In such examples, the first input may be a scan of a fingerprint. As previously described, the fingerprint scanner may be integrated with the device. That is, the fingerprint scanner may be part of the device and may be located, for instance, on an outer surface thereof, although examples are not so limited. A first input may be received when a user places a finger on the fingerprint scanner and allows the fingerprint scanner to capture an image of the fingerprint.

At 550, method 546 may include comparing the first input to a database of known first inputs. As previously described, a database of known first inputs may comprise a series of first inputs corresponding to a plurality of users with access and/or authority to access the device. In some examples, the database of known first inputs may be a database of known fingerprints. Comparing the first input to a database of known first inputs at 440 may include comparing the features of the received first input with the features of the known first inputs. Thus, when the received first input is a fingerprint, comparing the first input to the database of known first inputs at 550 may comprise comparing the pattern of the received fingerprint to the patterns of the known fingerprints included within the database.

At 552, method 546 may include disengaging a magnetic switch. As described with respect to FIG. 2, the magnetic switch may be coupled to the fingerprint scanner. In some examples, the magnetic switch may be disengaged at 552 in response to a determination that the comparison of the first input to the database of known inputs at 550 resulted in a match. That is, disengaging a magnetic switch at 552 may occur when the first input is determined to match a known input as a result of the comparison at 550. Disengaging a magnetic switch at 552 may permit greater access to the device. For example, the magnetic switch may couple a lid of the device to a base of the device, such that disengaging the magnetic switch at 552 may allow the lid of the device to be raised. In some examples, disengaging a magnetic switch at 552 may further provide power to an IR sensor located on the device If, however, the comparison of the first input to a database of known first inputs at 550 does not result in a match, method 546 may further include refraining from disengaging the magnetic switch. Said differently, the magnetic switch may not be disengaged at 552 if no match between the first input and a known first input is made. In some examples, refraining from disengaging the magnetic switch may restrain access to the device by, for instance, keeping a lid of the device coupled to the base of the device.

At 554, method 546 may include receiving a second input. The second input may be received at an IR scanner of the device. As described previously, the IR scanner may be an iris scanner. Thus, receiving a second input at 554 may include receiving an IR scan of an iris pattern.

In some examples, a plurality of IR scanners may be used. Method 546 may therefore include receiving, at a first IR scanner of the device, a third input. The third input may be a first scan of an iris pattern of a user Method 546 may further include receiving a fourth input from a second IR scanner of the device. The second IR scanner may be different than the first IR scanner, and may be located at a different location on the device than the first IR scanner. The fourth input may be a second scan of the iris pattern of the user. In some examples, the third input and the fourth input may be taken substantially simultaneously; that is, the first and second IR scanners may perform their scans at the same time. Upon receipt of the third and fourth inputs, method 546 may further include combining the third input and the fourth input to form a single input. In some examples, the single input may be a single image of the user's iris pattern.

Although the use of two inputs to form a single input is described, examples are not so limited, and any number of inputs may be used.

At 556, method 546 may include comparing the second input to a database of known second inputs. As previously described, a database of known second inputs may comprise a plurality of second inputs corresponding to a plurality of users with access and/or authority to access the device. In some examples, the database of known second inputs may be a database of known iris scan patterns. Comparing the second input to a database of known second inputs at 556 may include comparing the features of the received second input with the features of the known second inputs. Thus, when the received second input is an iris scan, comparing the second input to the database of known second inputs at 556 may include comparing the pattern of the received iris scan to the patterns of the known iris scans included within the database.

In some examples, the second input compared to the database of known second inputs at 556 may be the single input created by combining the third input and the fourth input. That is, the single input may be compared to the known inputs to determine whether a match between the signal input and the known inputs exists. In such examples, the third input may be combined with the fourth input prior to performing the comparison at 556.

At 558, method 546 may include engaging an electronic switch of the device. As described with respect to FIG. 2, the electronic switch may be coupled to the IR scanner and may further be coupled to components of the device. In some examples, the electronic switch may be disengaged at 558 in response to a determination that the comparison of the second input to the database of known second inputs at 556 resulted in a match. That is, engaging an electronic switch at 558 may occur when the second input is determined to match a known second input as a result of the comparison at 556. Engaging a magnetic switch at 558 may further provide power to the components of the device. In some examples, engaging an electronic switch at 558 may include beginning a boot sequence of the device, thus allowing an operating system of the device to run.

If the comparison of the second input to a database of known second inputs at 556 does not result in a match, method 546 may further include refraining from engaging the electronic switch. Said differently, the electronic switch may not be engaged at 558 if no match between the second input and a known second input is made. In some examples, refraining from engaging the electronic switch may include refraining from beginning a boot sequence of the device.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A system, comprising:
   a fingerprint scanner to perform a first authentication of a user;
   a magnetic switch coupled to the fingerprint scanner to unlock a lid of a computing device from a base of the computing device in response to the first authentication of the user by the fingerprint scanner;
   an infrared (IR) scanner coupled to the magnetic switch to receive electrical power in response to the magnetic switch unlocking the lid of the computing device and to perform a second authentication of the user in response to receiving the electrical power; and
   an electronic switch coupled to the IR scanner to provide electrical power to a plurality of components of the computing device in response to the second authentication of the user by the IR scanner.

2. The system of claim 1, wherein:
   the fingerprint scanner receives an input; and
   the magnetic switch disengages upon a determination by the fingerprint scanner that the input from the fingerprint scanner corresponds to a known fingerprint.

3. The system of claim 2, wherein upon disengagement of the magnetic switch, a lid of a computing device opens.

4. The system of claim 1, wherein:
   the IR scanner receives an input corresponding to an iris scan; and
   the electronic switch engages upon a determination by the IR scanner that the input from the IR scanner corresponds to a known iris pattern.

5. The system of claim 4, wherein upon engagement of the electronic switch, an operating system of a computing device runs.

6. A non-transitory computer readable medium containing instructions executable by a processor to:
   receive a first input from a user at a fingerprint scanner;
   compare the input at the fingerprint scanner to a database of known inputs for the fingerprint scanner;
   determine that the input at the fingerprint scanner matches a known input for the fingerprint scanner in a database;
   disengage a magnetic switch in response to the determination that the input at the fingerprint scanner matches a known input for the fingerprint scanner in the database, wherein the magnetic switch unlocks a lid of a computing device from a base of the computing device in response to the determination that the input at the fingerprint scanner matches the known input for the fingerprint scanner in the database; and
   engage an infrared (IR) scanner in response to the disengagement of the magnetic switch, wherein the IR scanner is to receive electrical power in response to the magnetic switch unlocking the lid of the computing device;
   instruct the IR scanner to perform an iris authentication of the user in response to receiving the electrical power; and
   instruct an electronic switch coupled to the IR scanner to provide electrical power to a plurality of components of the computing device in response to the iris authentication of the user by the IR scanner.

7. The non-transitory computer readable medium of claim 6, further comprising instructions executable by the processor to:

determine that the input at the fingerprint scanner does not match a known input for the fingerprint scanner in the database; and refrain from disengaging the magnetic switch in response to the determination that the input at the fingerprint scanner does not match the known input for the fingerprint scanner.

8. The non-transitory computer readable medium of claim 6, further comprising instructions executable by the processor to:

receive an input at the infrared (IR scanner);

determine that the input at the IR scanner does not match a known input for the IR scanner in the database; and refrain from engaging the electronic switch in response to the determination that the input at the IR scanner does not match the known input for the IR scanner.

9. The non-transitory computer readable medium of claim 6, wherein the instructions to engage the electronic switch include instructions executable to begin a booting sequence of a device, wherein the device includes the fingerprint scanner and the IR scanner.

10. A method, comprising:

receiving, at a fingerprint scanner of a computing device, a first input;

comparing the first input to a database of known first inputs;

disengaging a magnetic switch of the computing device in response to a determination that the first input matches a known input in the database of known first inputs, wherein the magnetic switch unlocks a lid of the computing device from a base of the computing device in response to the determination that the input matches the known input in the database of known first inputs;

activating, by providing electrical power, in response to the magnetic switch unlocking the lid of the computing device to an infrared (IR) scanner of the device;

receiving, at the IR scanner of the computing device, a second input;

comparing the second input to a database of known second inputs; and engaging an electronic switch of the computing device in response to a determination that the second input matches a known input in the database of known second inputs, wherein the electronic switch is to provide electrical power to a plurality of components of the computing device and to begin a booting sequence of the computing device in response to the determination that the second input matches the know input in the database of known second inputs.

11. The method of claim 10, further comprising refraining from disengaging the magnetic switch of the device in response to a determination that the first input does not match a known input in the database of known first inputs.

12. The method of claim 10, further comprising refraining from engaging the electronic switch of the device in response to a determination that the second input does not match a known input in the database of known second inputs.

13. The method of claim 10, wherein receiving a second input at the IR scanner of the device further comprises receiving an IR scan of an iris pattern.

14. The method of claim 10, wherein receiving a second input at the IR scanner of the device further comprises:

receiving a third input from a first IR scanner of the device;

receiving a fourth input from a second IR scanner of the device; and combining the third input and the fourth input to form a single input.

* * * * *